Patented May 16, 1950

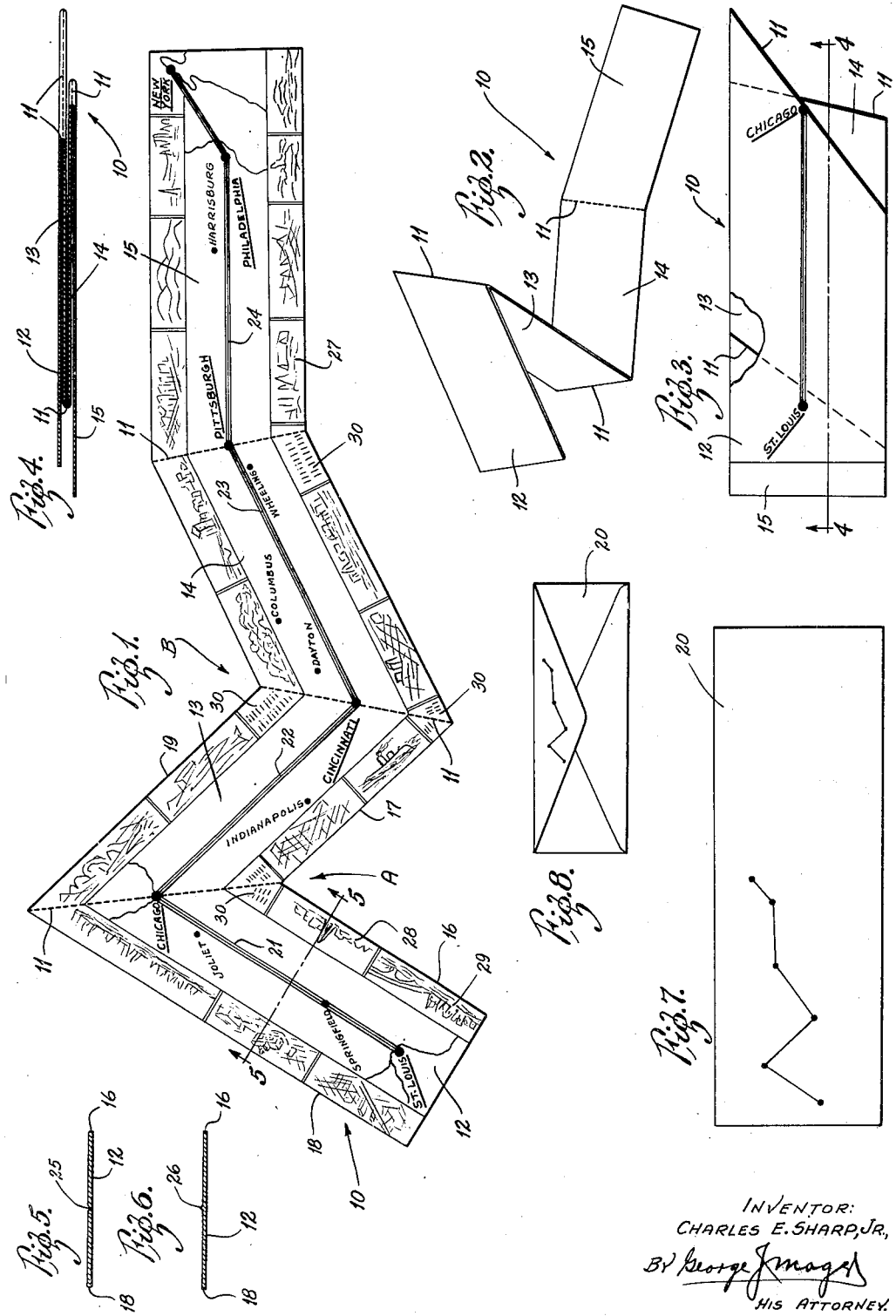

2,507,615

UNITED STATES PATENT OFFICE 2,507,615

FOLDING MAP

Charles E. Sharp, Jr., University City, Mo.

Application August 4, 1945, Serial No. 608,900

3 Claims. (Cl. 283—34)

The present invention in general relates to maps, and in particular to folding maps having thereon a portion of the earth's surface together with visual means representing or indicating a line or route of travel along said surface.

An object of the invention is to provide a map of this type which is formed from a single blank of pasteboard, cardboard, or the like, suitably scored along spaced predetermined lines to facilitate folding thereof into a substantially rectangular form, albeit prior to folding, portions thereof between score lines may be angularly disposed with respect to an adjacent portion or portions of the whole.

Another object of the invention is to provide a folding map having thereon a portion of the earth's surface, and also having thereon visual means representing a selected line or route of travel along said surface from a starting point to a terminal point, said line or route of travel generally extending lengthwise of the integral panel sections formed by scoring or perforating the blank along selected lines.

A further object of the invention is to provide a folding map having thereon a portion of the earth's surface, and also having thereon visual means representing a selected line or route of travel along said surface from a starting point to a terminal point, said line or route of travel generally extending lengthwise of the integral panel sections formed by scoring or perforating the blank along selected lines, and said line or route of travel substantially representing the actual geographical direction or directions to be followed.

A further object of the invention is to provide a folding map of this type comprising a single piece of cardboard, pasteboard, or the like, scored or perforated in such manner as to be divided into a plurality of complementary panel sections adapted, when folded, to produce a substantially quadrilateral form having its upper and lower bases parallel, facilitating insertion thereof into, and withdrawal thereof from, an envelope of slightly greater corresponding dimensions, and adapted, when unfolded, to exhibit a portion of the earth's surface having depicted thereon a trip or route of travel from a starting point to a finishing point, both of which points obviously are located within the confines of said map.

Other objects and features will be noted or apparent from the description to follow, reference being had to the accompanying drawing wherein is illustrated an embodiment of the invention depicting a trip from St. Louis to Chicago, thence to Cincinnati, thence to Pittsburgh, thence to Philadelphia, and thence to New York city, or vice versa.

In said drawing:

Fig. 1 is a plan view of a blank having a map of a portion of the earth's surface thereon, together with visible means representing a line or route of travel along said surface, the blank being scored or perforated along predetermined lines to facilitate folding;

Fig. 2 is a view on a reduced scale of the blank in partially folded position;

Fig. 3 is a plan view thereof completely folded;

Fig. 4 is a vertical sectional view through the folded blank on the line 4—4 of Fig. 3.

Fig. 5 is a cross-sectional view on the line 5—5 of Fig. 1, showing, in particular, one form of means representing a line or route of travel;

Fig. 6 is a similar view, illustrating, in particular, another form of means representing a line or route of travel;

Fig. 7 is a view of the front side of an envelope adapted to contain the folded map of Figs. 3 and 4; and Fig. 8 is a view on a reduced scale of the rear side of said envelope.

As illustrated, particularly in Figs. 1, 2, 3 and 4, the invention preferably comprises a single blank of carboard, pasteboard or the like generally indicated 10, scored or perforated, transversely along the lines 11, whereby the blank is divided into a plurality of panels or sections, the score lines in effect constituting a hinged connection between adjacent panels.

In the embodiment illustrated, four such panels, 12, 13, 14 and 15, are provided, each angularly disposed relative to its adjacent panel. Obviously, the number of such panels is dependent upon the length of the route depicted, as well as upon the directional changes of the route, as is understood. Thus the folding map of my invention may comprise two, three, four, five or more panels, each hingedly connected to its adjacent panel or panels, and each angularly disposed relative to its adjacent panel or panels, or parallel therewith in some instances.

Where two adjoining panels are angularly disposed relative to one another, the score line between them constitutes a continuation of an imaginary line bisecting the exterior angle formed by said panels. Consequently, when said panels have been folded along said score line and superimposed one upon the other, the sides of said angle, each of which forms the marginal edge of one panel, are in registration. And since, as shown, the opposite free marginal edges of each panel are parallel, these are likewise in registration.

Thus, the score line 11, forming the fold or hinge line between the panels 12 and 13, is a continuation of an imaginary line bisecting the exterior angle A whose sides constitute the free marginal edges 16 and 17, respectively, of said panels. The opposite free marginal edge 18 of panel 12 is parallel with the edge 16, and similarly the opposite marginal edge 19 is parallel with the edge 17 of panel 13.

Similarly, the score line 11 forming the fold or hinge line between the panels 13 and 14 is a continuation of an imaginary line bisecting the exterior angle B, and so on.

With this arrangement, the blank of Fig. 1, when folded, assumes the substantially quadrilateral compact form illustrated in Figs. 3 and 4, readily insertable into and removable from the envelope 20 of Figs. 7 and 8.

The visual line of travel or route along that portion of the earth's surface portrayed by the paneled foldable blank 10 is designated by the numerals 21, 22, 23 and 24, respectively, on the panels or sections 12, 13, 14 and 15.

Obviously, regardless of the directional course, or the number of panels incorporated in the map, the said visual travel line is a continuous one from starting point to destination, or vice versa. It may be a straight line, an undulated line, or a zigzag line.

As illustrated, particularly in Fig. 5, said line may be in the form of a shallow V-shaped groove or longitudinal depression 25, the walls of which are colored distinctively so as to make it the predominant feature of the map.

Conversely, as illustrated particularly in Fig. 6, said line may be in the form of an inverted V-shaped rib or longitudinal protuberance 26, the tangible walls of which are likewise colored distinctively so as to make it the predominant feature of the map.

From the foregoing, it should be evident that the invention provides a novel folding map particularly useful to passengers of aircraft or railroads. If designed according to the teachings of the invention, each map, when folded, results in a flat, compact, substantially quadrilateral device which may be conveniently inserted into and withdrawn from an envelope, whose front and back sides may be marked to indicate the particular route on the map therein.

As indicated in Fig. 1, points of interest along the route of travel, the skylines of cities, as well as advertising matter, may be portrayed along the marginal portions of the panels. For instance, the steel mills of Pittsburgh are pictured at 27, Lincoln's tomb at 28, the skyline of St. Louis at 29, and advertising copy may appear at 30.

The embodiment illustrated and described is exemplary only, and the invention is therefore not to be limited to this precise arrangement. Obviously, a line or route of travel other than that shown may be depicted without departing from the nature and principle of the invention. Likewise, the panels or sections forming the complete map may be hingedly secured together in foldable relation by means other than those described.

I claim:

1. A folding map formed from a single blank of cardboard or the like having thereon a map of a portion of the earth's surface, visual means on said map for indicating a continuous line of travel between points designated on the map, said blank including a plurality of integral panel sections angularly disposed relative one another and corresponding to the angularity of portions of the line of travel, and a fold line between each pair of adjacent panel sections whereby said sections may be superimposed upon one another, said fold line constituting a continuation of an imaginary line bisecting the exterior angles formed by said angularly disposed panel sections.

2. In a folding map formed from a single blank of cardboard or the like having thereon a map of a portion of the earth's surface and having a continuous line of travel visually indicated on the map; a plurality of integral panel sections angularly disposed relative to one another, the angularity of each of said sections corresponding to the angularity of that portion of the line of travel appearing thereon, and means whereby said sections may be superimposed one upon the other so that their principal edges coincide, said means comprising a single fold line formed between each pair of adjacent panel sections which if extended would bisect the exterior angle obtaining between them.

3. In a folding map formed from a single blank of cardboard or the like having thereon a map of a portion of the earth's surface and having a continuous line of travel visually indicated on the map; a plurality of integral panel sections angularly disposed relative to one another, the angularity of each of said sections corresponding to the angularity of that portion of the line of travel appearing thereon, and means whereby said blank may be folded so that said panel sections may be superimposed one upon the other to provide a compact, substantially quadrilateral device adapted to be readily inserted into or withdrawn from an envelope of slightly greater dimensions, said means comprising a single fold line formed between each pair of adjacent panel sections which if extended would bisect the exterior angle obtaining between them.

CHARLES E. SHARP, Jr.

REFERENCES CITED

The following references are of record in the file of this patent:

UNITED STATES PATENTS

| Number | Name | Date |
|---|---|---|
| 467,118 | Hawkins | Jan. 12, 1892 |
| 674,146 | White | May 14, 1901 |
| 1,228,197 | Flenniken | May 29, 1917 |
| 1,618,839 | Lisk | Feb. 22, 1927 |